United States Patent [19]
Mitchell

[11] 3,727,336
[45] Apr. 17, 1973

[54] COTTON BALE TAG HOLDER

[76] Inventor: Joseph L. Mitchell, 234 North Fraser Drive, Mesa, Ariz. 85201

[22] Filed: May 5, 1971

[21] Appl. No.: 140,387

[52] U.S. Cl. ................................................40/305
[51] Int. Cl. ................................................G09f 3/08
[58] Field of Search ...............................40/305, 22

[56] References Cited

UNITED STATES PATENTS

| 1,269,630 | 6/1918 | Moore | 40/305 |
| 1,248,047 | 11/1917 | Woolley | 40/305 |
| 3,394,856 | 7/1968 | Mitchell | 40/305 |
| 38,363 | 4/1863 | Fitch | 40/305 |
| 77,424 | 4/1868 | Weeden | 40/305 |

Primary Examiner—Robert W. Michell
Attorney—Drummond, Cahill & Phillips

[57] ABSTRACT

A tag holder for cotton bales adapted to be placed in a substantially vertical direction between a cotton bale and its binding means; said tag holder having teeth on the sides thereof adapted to engage the cotton bale for retaining the tag holder in place thereon.

1 Claim, 4 Drawing Figures

PATENTED APR 17 1973 3,727,336

INVENTOR.
JOSEPH L. MITCHELL
BY
Drummond Cahill & Phillips
ATTORNEYS

COTTON BALE TAG HOLDER

Various means have been used for holding identification tags on bales of cotton and it has been necessary in many instances to attach such tags when the bales of cotton are stacked to a substantial elevation, one upon the other, and such elevated stacking of cotton bales has rendered it difficult to place tags on cotton bales above the normal reach of a human being.

Prior art tag holders have included several devices for connection thereof to cotton bales, and many of such devices have been projected into bales of cotton in a generally horizontal direction.

Placing tag holders in connection with cotton bales, which are disposed in a substantially elevated position, poses problems and when a spike-shaped device is driven horizontally into a cotton bale at an elevated position, it is necessary to utilize an extended arm of some kind which may apply lateral or horizontal force to a tag holder for projecting it into a cotton bale. Additionally, such elevated placement of a tag on a bale of cotton has been difficult to accomplish when devices are used to attach the tags to the surrounding binding means on a bale.

Additionally, it is desirable that tags on cotton bales should be readily readable when the cotton bales are disposed in stacked position, and it is desirable that tags in connection with cotton bales extend horizontally, and that the sides of the tags extend vertically so that the information on the tags may readily be read from various positions in order to facilitate the inventory and transportation of such cotton bales from a source to various areas.

In accordance with the present invention, a generally wedge-shaped tag holder is adapted vertically to be moved adjacent to the side of a cotton bale and wedged between said cotton bale and a binding means which is generally used in surrounding relation with such bales. The tag holder of the invention is provided with anchor teeth on one side, adapted to engage the cotton of a bale, while the opposite side of the holder is engaged with the binding means of the bale. Thus, the anchor teeth are held in frictional engagement with the side of the bale of cotton, and the tag holder of the invention is thus vertically supported in secure relationship therewith. The tag holder of the invention is also provided with a projection adapted snugly to fit into the eye of an eyelet generally used in connection with cotton bale identification tags. The projection is disposed in a horizontal position at substantially right angles to a side of the holder, which engages with the cotton bale, so that the holder supports a tag with its upper and lower edges directed generally horizontally and it opposite sides directly at substantially right angles to a side of the cotton bale engaged by the holder. Additionally, the tag holder of the invention is provided with a vertical surface adapted to engage one edge of a tag to prevent it from rotating about the projection on which the eyelet of the tag is frictionally engaged, whereby the tag is prevented from pivoting downwardly around the axis of the projection on which the eyelet of the tag is supported. The tag holder of the invention is provided with inner and outer sides and these inner and outer sides generally converge in a normally vertical direction so that a juncture of the inner and outer sides at the upper end of the holder forms a very thin edge which is readily and easily insertable between a cotton bale and a binding means thereon. In this manner, anchor teeth at the inner side of the holder become frictionally engaged with and embedded in a side of a cotton bale while the outer side of the holder is wedgingly and tightly engaged by a binding means surrounding the cotton bale. The holder of the invention is also provided with a socket open at its lower end adapted to receive a handling rod, so that the tag holder of the invention may be supported on a handling rod and forced vertically upward between the side of the cotton bale and its binding means and may be so connected to a cotton bale at elevations substantially above the normal human reach, whereby cotton bales which are stacked one upon the other may readily be tagged by an operator standing on the ground.

Accordingly, it is an object of the present invention to provide a very simple and economical cotton bale tag holder which is wedgingly adapted to be secured between a cotton bale and its surrounding binder means so that the holder of the invention may readily be inserted in a vertical direction upward between a cotton bale and binding means extending there around for securing an identification tag to a cotton bale.

Another object of the invention is to provide a novel tag holder for cotton bales, having upwardly converging inner and outer sides which converge to a thin edge adapted readily to be inserted between a cotton bale and its binding means; said inner side having anchor teeth adapted to embed themselves in a cotton bale due to compression of the binding means on the outer side of the holder.

Another object of the invention is to provide a tag holder for cotton bales which is very easily connected with cotton bales by an operator standing on the ground and connecting said tags to cotton bales stacked such that they are elevated substantially above the normal human reach.

Yet another object of the invention is to provide a tag holder for cotton bales which efficiently supports an identification tag in connection with a cotton bale such that the tag, at its upper and lower edges, extends substantially horizontally from the bale and whereby opposite sides of the tag are exposed at substantially right angles to the side of a cotton bale.

Still another object of the invention is to provide a tag holder for cotton bales which may readily be made of plastic or other material and thus may be very economically produced.

Yet still another object of the invention is to provide a novel cotton bale tag holder having a handling rod socket in its lower end adapted to facilitate forceful vertical placement of the tag holder of the invention wedgingly between one side of a cotton bale and its binding means at elevations above the normal human reach.

Further objects and advantages of the invention may be apparent from the specifications, appended claims and accompanying drawings, in which:

Figure 1:
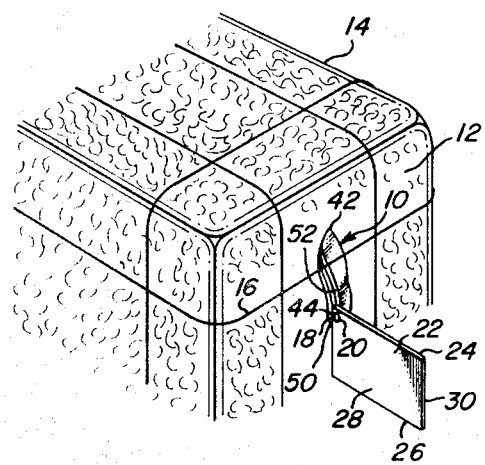
FIG. 1 is a perspective view of a cotton bale tag holder in accordance with the present invention and showing the tag holder wedgingly disposed between a side of a cotton bale and its binding means; said tag holder also shown supporting a tag thereon.

As shown in FIG. 1 of the drawings, the tag holder 10 of the invention is wedged between a side 12 of a cotton bale 14 and a binding means 16 which surrounds the cotton bale. This binding means 16 may be of wire or any other suitable material normally used to surroundingly bind a cotton bale.

The holder 10 is provided with a projection 18 on which an eyelet portion 20 of an identification tag 22 is frictionally engaged for holding the tag such that its upper and lower edges 24 and 26 are disposed horizontally and its opposite sides 28 and 30 are disposed substantially at right angles to the side 12 of the cotton bale 14.

Figure 2:
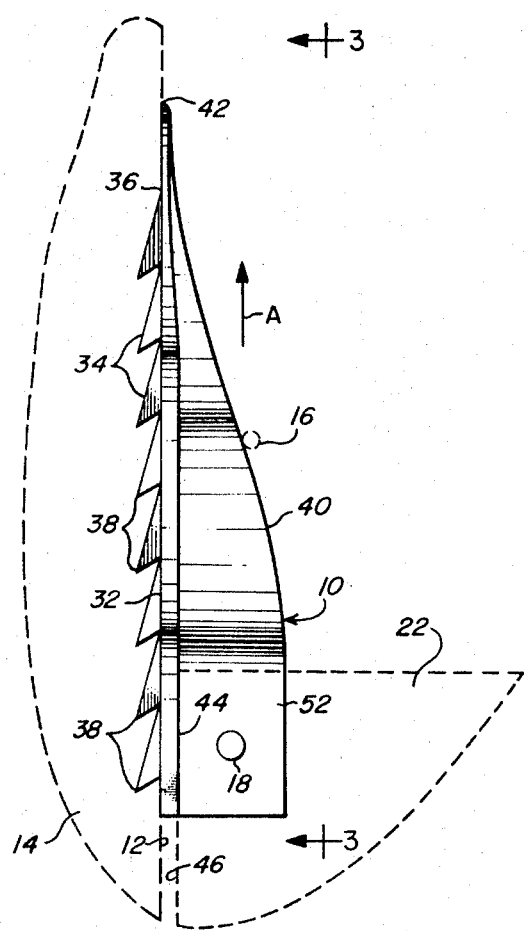
FIG. 2 is an enlarged side elevational view of a cotton bale tag holder of the invention and illustrating a cotton bale and binding means in broken lines relative thereto and further showing a fragmentary portion of a tag held in connection with the holder, the holder being shown wedged between a side of a cotton bale and its binding means.

As shown in FIG. 2 of the drawings, the tag holder of the invention is provided with an inner side 32 having a plurality of anchor teeth 34 disposed in a substantially vertical row. The anchor teeth 34 are generally buttress-shaped and converge to a plane of the inner side 32 at upper edges 36 of said anchor teeth. These anchor teeth 34 are provided with outwardly projecting anchor ledges 38 adapted to frictionally engage the side 12 of the cotton bale 14. These ledge portions 38 tend to embed themselves readily in the soft cotton of the bale and to prevent downward displacement of the tag holder relative to the cotton bale as will be hereinafter described in detail.

It will be seen that the holder as shown in FIG. 2 is provided with an outer side 40 which converges generally in an upward direction relative to the inner side 32 and convergence of the sides 32 and 40 forms a thin-edged juncture 42 at a normally upper end of the holder 10, and this thin-edged juncture 42 may be readily inserted between the binding means 16 and the side 12 of the bale 14, and in this manner may wedgingly be moved in an upward direction between the bale and the binding means 16 in the direction of an arrow A. Thus the tag holder of the invention may be vertically moved and wedgingly secured between the side 12 of the cotton bale 14 and its binding means 16, all as shown best in FIGS. 1 and 2 of the drawings. The projection 18 is of a diameter which may snugly fit the eyelet 20 of an identification tag 22 and a vertical surface 44 of the tag holder is adapted to be engaged by an edge 46 of the tag 22 for holding it in position, as shown in FIGS. 1 and 2 of the drawings, and for preventing it from rotating downwardly about the projection 18.

Figure 3:
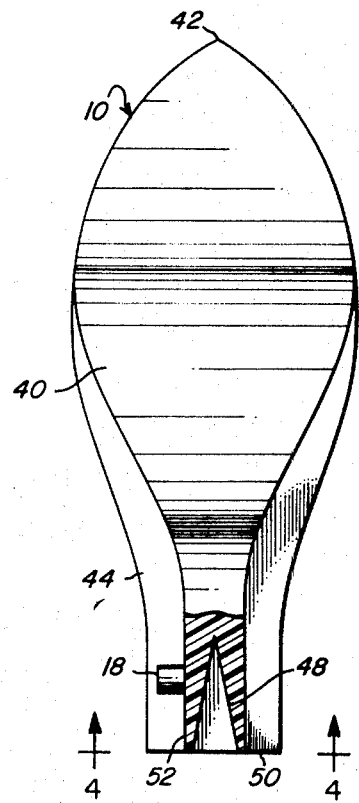
FIG. 3 is a view of an outer side of the tag holder of the invention taken from the line 3—3 of FIG. 2.
Figure 4:
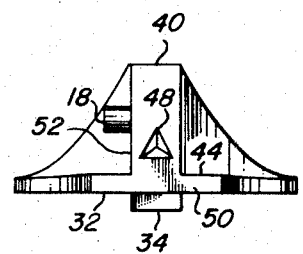
FIG. 4 is a normally lower end view of the tag holder of the invention taken from the line 4—4 of FIG. 3.

As shown in FIGS. 3 and 4 of the drawings, a socket 48 is provided in the normally lower end 50 of the tag holder of the invention. The socket 48 is an upwardly converging socket adapted to receive a pointed upper end of a handling rod so that the holder 40 together with a tag 22 may be disposed on the upper end of a handling rod and projected substantially above the normal reach of a human being for wedgingly forcing the holder of the invention between the side 12 of the cotton bale 14 and its binding means 16, as shown in FIG. 2 of the drawings. The socket 48 secured on an elongated handling rod thus permits a human operator to tag cotton bales which are substantially above his normal reach. This facilitates the tagging of cotton bales which are stacked in superimposed relationship to each other to a substantial elevation.

The vertical movement of the tag holder 10 in the direction of the arrow A, as shown in FIG. 2 of the drawings, permits the operator to efficiently and wedgingly secure the holder 10 between the side 12 of the bale 14 and the binding means 16, such that the anchor teeth 34 at their anchor ledges 38 prevent the holder from moving vertically downwardly and becoming displaced from the side 12 of the cotton bale 14.

The projection 18 extends from a substantially vertical surface 52 disposed at right angles to the vertical surface 44, and this surface 52 is adapted to engage the side 30 of the tag 22 whereby the projection 18 and the surfaces 44 and 52 hold the tag in the position as shown in FIG. 1 and as hereinbefore described so that the tag and indicia thereon may readily be observed by persons who are in charge of the inventory of cotton bales or the transportation thereof.

It will be obvious to those skilled in the art that various modifications of the invention may be resorted to without departing from the spirit of the invention.

I claim:

1. A tag holder for cotton bales especially adapted to facilitate remote attachment of a tag to a cotton bale by an operator standing on a surface a substantial distance below the location of said bale, said bale having bale-binding means running horizontally around the periphery thereof, said tag holder comprising:

a. a vertical plate member having an inner side and an outer side;
   b. wedge means carried on the outer side of said plate member perpendicularly thereto, the thin edge of said wedge means pointing upwardly, said plate - wedge combination being shaped and dimensioned to be inserted upwardly between said bale-binding means and said bale, forcing the inner side of said plate into engagement with the outside of said bale;
   c. bale-engaging tooth members carried on the inner side of said plate member, shaped and dimensioned to engage said bale to prevent said plate - wedge combination from moving downwardly out of engagement between said bale and said bale-binding means;
   d. a horizontal projecting member carried by said wedge means, parallel to and spaced from said plate member, said projecting member being shaped and sized so as to be adapted to be received snugly in an eyelet formed in the upper edge of a cotton bale tag, so as to position said tag to project perpendicularly outwardly from the side of said bale; and
   e. socket means formed in the lower wide edge of said wedge means, adapted to receive the upper end of a tag holder positioning pole.

* * * * *